Figure 1:
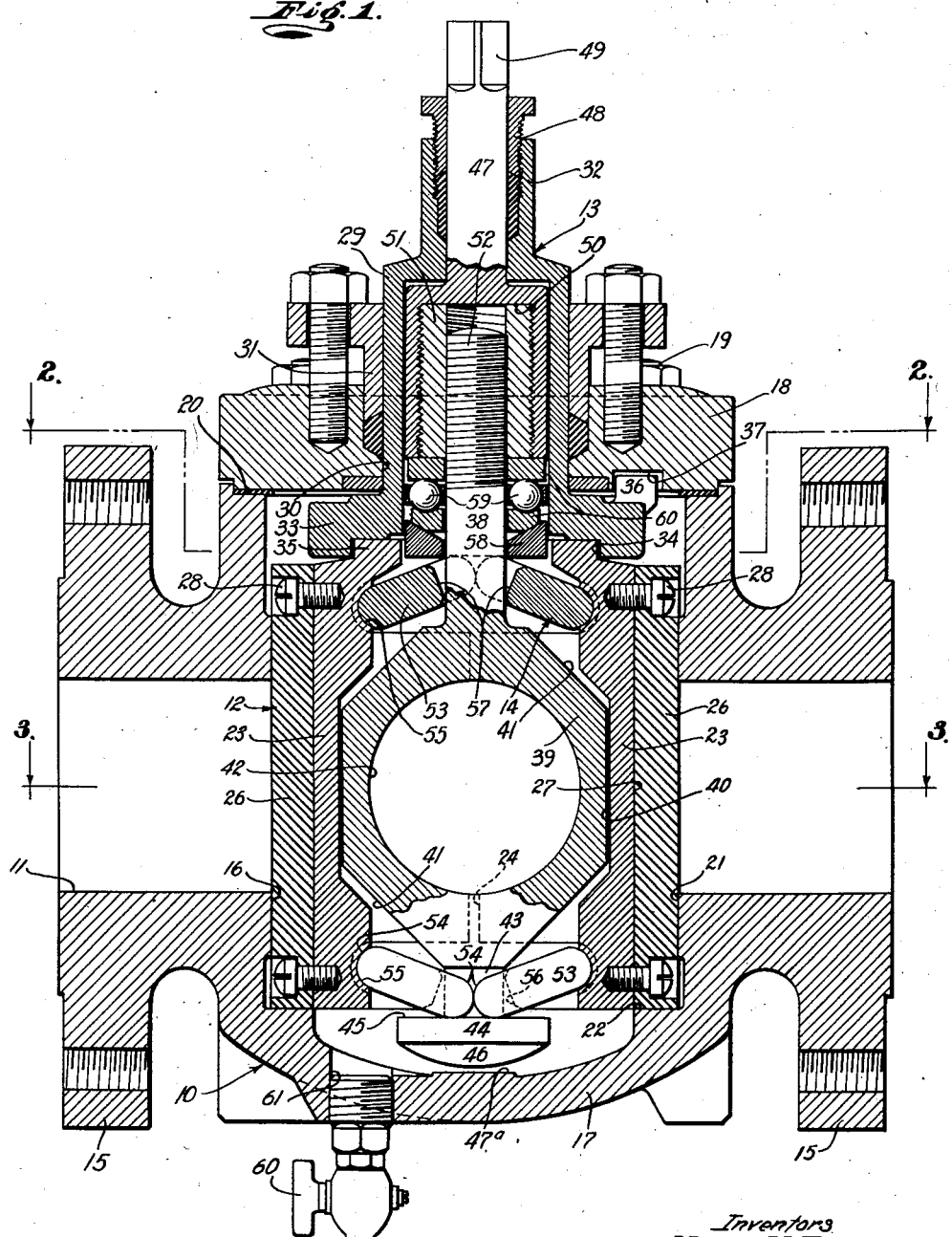

March 9, 1937.  H. H. ROBINSON ET AL  2,072,965
VALVE
Filed Nov. 12, 1934  3 Sheets-Sheet 1

Inventors
Henry H. Robinson
and
Theodore C. Plath
By
Their Attorney

March 9, 1937.  H. H. ROBINSON ET AL  2,072,965

VALVE

Filed Nov. 12, 1934  3 Sheets-Sheet 2

Inventors
Henry H. Robinson
and Theodore C. Plath
By
Their Attorney

March 9, 1937. H. R. ROBINSON ET AL 2,072,965
VALVE
Filed Nov. 12, 1934 3 Sheets-Sheet 3

Inventors
HENRY H. ROBINSON
and
THEODORE C. PLATH
By
[signature]
Their Attorney

Patented Mar. 9, 1937

2,072,965

UNITED STATES PATENT OFFICE 2,072,965

VALVE

Henry H. Robinson and Theodore C. Plath, Los Angeles, Calif., assignors to Robinson Orifice Fitting Company, Los Angeles, Calif., a corporation of Nevada Application November 12, 1934, Serial No. 752,634

2 Claims. (Cl. 251—102)

This invention relates to a valve and relates more particularly to a stop cock or plug valve. A general object of the invention is to provide a practical valve of the character mentioned that is effective and dependable in operation.

Another object of the invention is to provide an improved valve of the class described and claimed in our co-pending application entitled Stop cock, Serial No. 717,404, filed March 26, 1934, now Patent No. 2,038,132, granted Apr. 21, 1936.

Another object of the invention is to provide a valve comprising a sectional valve plug whose sections are actuated or forced into tight even sealing cooperation with the wall of the valve body by equalized and balanced pressures to positively seal off the flow through the valve.

Another object of the invention is to provide a valve of the character mentioned that includes a novel improved means for actuating or forcing the plug sections against the internal seats of the body to provide fluid tight seals at both the up and downstream sides of the valve, said means applying equalized and balanced forces to each of the sections at spaced points, whereby the sections seal evenly and equally throughout their sealing surfaces.

Another object of the invention is to provide a valve of the character mentioned in which the means for actuating the sections of the plug into sealing contact with the body include toggles directly cooperating with one another and acting directly against the sections.

Another object of the invention is to provide a valve of the character mentioned in which the fluid passage through the plug is substantially unobstructed.

Another object of the invention is to provide a valve that is very easy to open and close. In the valve of the present invention the sealing surfaces of the plug sections do not frictionally cooperate with the body wall during turning of the plug between its open and closed positions and the plug sections are tilted or pivoted during the opening movement of the plug so that their sealing surfaces are freed from the body wall and do not resist turning of the plug or cause scoring of the parts.

A further object of the invention is to provide a valve of the character mentioned embodying simplified and improved means for actuating the toggle means and for turning the plug.

Figure 2:
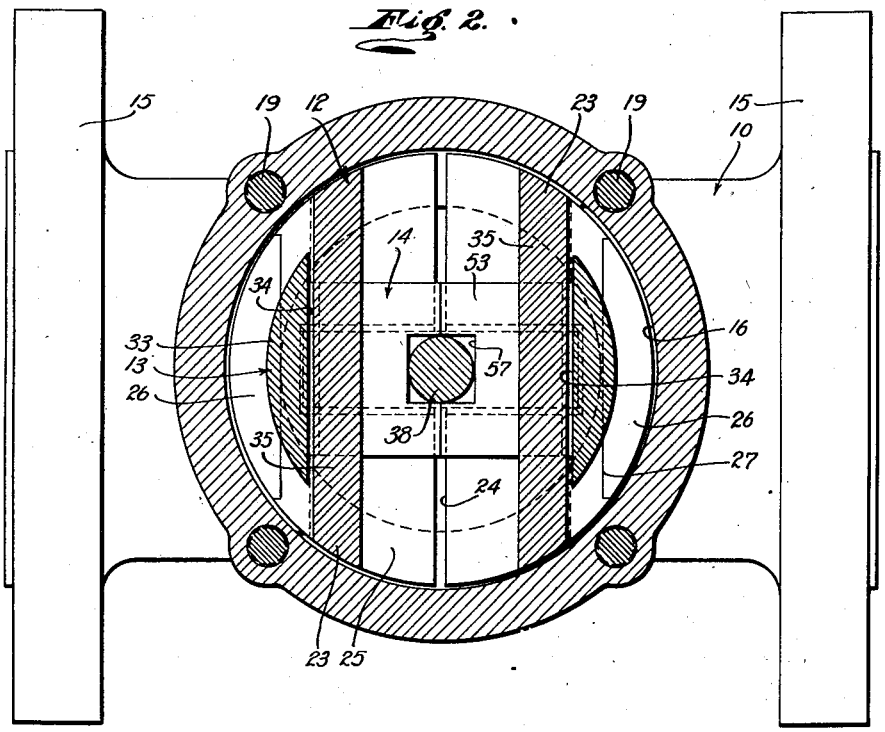
Figure 3:
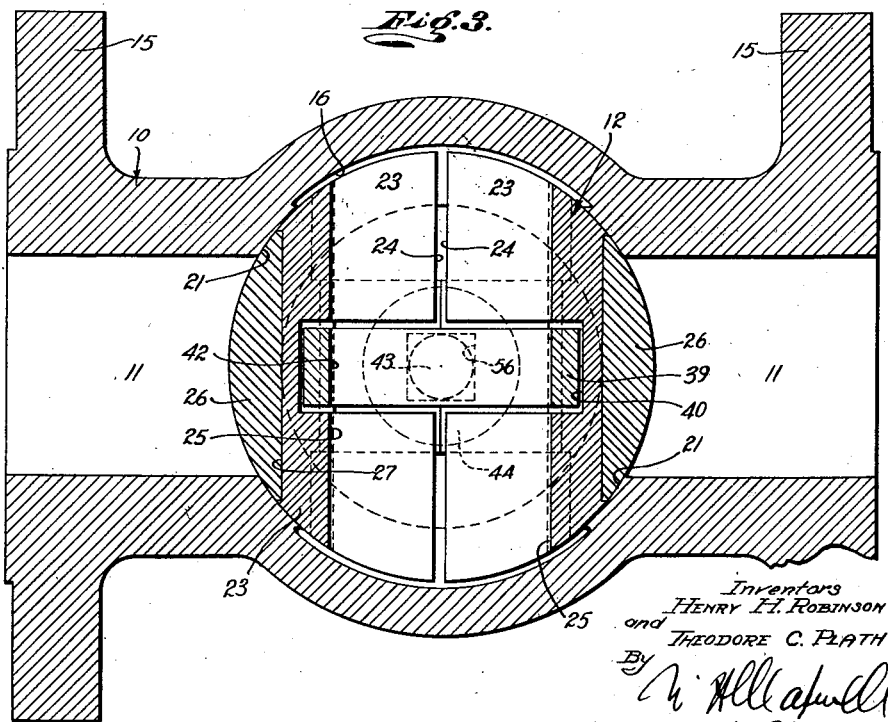
Figure 4:
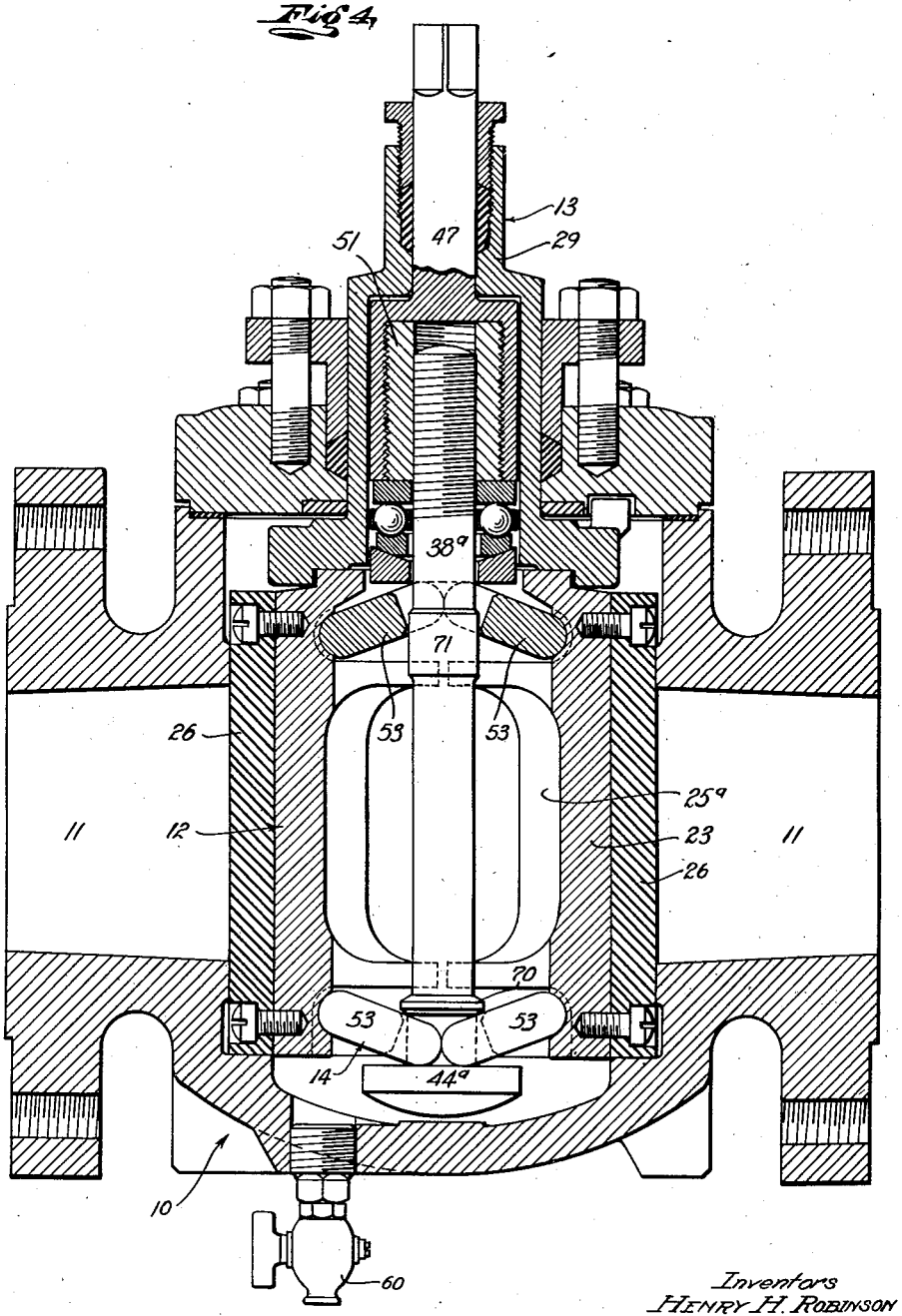

The various objects and features of our invention will be fully understood from the following detailed description of typical preferred forms and applications of our invention, throughout which description reference is made to the accompanying drawings, in which:

Fig. 1 is a central longitudinal detailed sectional view of one form of the invention illustrating the plug in the closed position. Fig. 2 is a transverse detailed sectional view taken substantially as indicated by line 2—2 on Fig. 1. Fig. 3 is a transverse detailed sectional view taken as indicated by line 3—3 on Fig. 1 and Fig. 4 is a central longitudinal detailed sectional view of another form of the valve showing the plug in the closed position.

The form of the invention illustrated in Figs. 1, 2, and 3 of the drawings includes, generally, a body 10 having a fluid passage 11, a sectional plug 12 in the body 10, means 13 for operating the plug between the open and closed positions, and means 14 for actuating or expanding the sections of the plug 12 to seal with the internal wall of the body 10 to close off the passage 11.

The body 10 may be varied somewhat in design and construction, depending upon the intended use or installation of the valve. In the particular embodiment of the invention illustrated in the drawings the body 10 is designed for installation in a pipe line. The means for connecting the valve body 10 in the conduit or pipe line may comprise flanges 15 surrounding the opposite ends of the passage 11. An opening 16 is provided in the body 10 to carry the plug 12, the opening 16 intersects the fluid passage 11 and is preferably normal to or at right angles to the passage. A lower body wall 17 closes the lower end of the opening 16 and a bonnet or cap 18 is provided to close the upper end of the opening. Studs or screws 19 may removably attach the cap 18 to the upper end portion of the body 10. A recessed or countersunk gasket 20 seals between the opposing surfaces of the cap 18 and body 10. The opening 16 is cylindrical and projecting or raised seats 21 are provided on its wall to surround the opposite end portions of the fluid passage 11.

The plug 12 is partially rotatable in the opening 16 between the open position and the closed position where it is operable to cut off the flow through the fluid passage 11. The flow controlling plug 12 is cylindrical in its general configuration and its inner end rests or turns on a shoulder 22 on the wall of the body opening 16. In accordance with the invention the plug 12 is sectional to be actuated or expanded into tight sealing cooperation with the seats 21. The plug 12 is split or divided longitudinally into two complementary sections 23. The inner opposing surfaces 24 of the plug sections 23 have substantial clearance to provide for the required relative movements between the sections during the expansion and contraction of the plug. A transverse opening 25 is provided in the plug 12 to register with the fluid passage 11 when the plug is in its open position. The opening 25 is preferably of the same configuration and capacity as the fluid passage 11. The opening 25 extends in the same direction as the line of separation or division of the plug 12 and is in the nature of grooves in the inner sides of the sections 23.

The invention provides replaceable inserts or shoes 26 on the plug sections 23 for sealing with the seats 21 of the body. Longitudinal grooves or recesses 27 are provided in the outer surfaces of the sections 23 to carry the shoes 26. The recesses 27 have flat walls and the shoes 26 are shaped to conform to the recesses. The shoes 26 are removably attached to the plug sections 23 by countersunk screws 28. The outer sides or surfaces of the shoes 26 are cylindrically curved to effectively cooperate with the seats 21. In practice the shoes 26 may project outwardly beyond the peripheral surfaces of the plug sections 23 whereby the peripheral surfaces of the sections have clearance with the seats 21 and the wall of the opening 16 during turning of the plug between its open and closed positions. The sealing shoes 26 of the plug 12 may be formed of various materials depending upon the character of the fluid to be handled by the valve. It may be found practical to form the shoes 26 of bakelite, bronze, copper, stainless steel or the like. The shoes 26 are sufficiently wide to have extensive engagement with the seats 21 to dependably seal off the passage 11.

The means 13 for turning the plug 12 between its open and closed positions includes a tubular stem or sleeve 29 extending through an opening 30 in the cap 18. The sleeve 29 is concentric with the axis of turning of the plug 12 and is sealed about by a suitable packing gland 31 on the cap 18. The outer portion 32 of the sleeve 29 projects from the gland 31 and is polygonal in cross section to be readily engageable by a suitable turning tool. A plate or radially projecting flange 33 is provided on the inner end portion of the sleeve 29 and is spaced between the cap 18 and the upper end of the plug 12. The flange 33 is proportioned to permit limited longitudinal movement of the sleeve 19 in the opening 30. The inner side of the flange 33 is transversely grooved to have spaced opposing flat shoulders 34. Keys 35 are provided on the upper ends of the plug sections 23 to be engageable by the shoulders 34. It is a feature of the invention that clearance is provided between the shoulders 34 and the keys 35 whereby the end portions of the shoulders 34 cooperate with the end portions of the keys 35 when the sleeve 19 is turned to cause the sealing surfaces of the shoes 26 to be swung free from the seats 21. Means is provided for limiting turning of the plug 12 and for setting or positioning the plug in its open and closed positions. A lug 36 is provided on the flange 33 and projects into a curved or arcuate groove 37 in the inner side of the cap 18. The lug 36 is adapted to cooperate with the opposite ends of the groove 38 to limit the turning of the plug and to stop the plug in its fully open position and fully closed position. The polygonal portion 32 of the sleeve 29 may be engaged by a suitable tool for the purpose of turning the plug 12 between its two positions.

The means 14 for expanding the plug 12 is operable to force the plug sections 23 outwardly to bring their shoes 26 into tight sealing cooperation with the seats 21 to seal off the upstream and the downstream ends of the fluid passage 11. The means 14 includes a stem 38 having a longitudinal axis coincident with the axis of rotation of the plug 12. The stem 38 extends upwardly through the upper end of the plug 12 into the sleeve 29. A laterally or transversely enlarged part 39 is provided on the stem 38 within the plug 12. The part 39 may be integral with the stem 38. The part 39 is preferably flattened to have flat parallel sides and parallel outer edges or ends. The opposite longitudinal edge portions of the part 39 are received in longitudinal grooves 40 in the inner sides of the plug sections 23. The grooves 40 are preferably spaced midway between the opposite longitudinal extremities of the sections 23 and lie in a common diametric plane. The grooves 40 are related to the part 39 to receive the part with substantial clearance and to provide for longitudinal movement of the part and stem 38 with respect to the plug 12. The upper and lower corner portions 41 of the stem part 39 may be cut away or bevelled as clearly illustrated in Fig. 1 of the drawings. In accordance with the invention the part 39 has a transverse opening 42 which registers with the opening 25 of the plug 12. The opening 42 is preferably of the same diameter as the opening 25 and operates to freely pass the fluid when the plug 12 is in its open position. A stem portion 43 projects from the lower end of the part 39 in longitudinal alignment with the stem 38. A head 44 is provided on the lower end of the stem portion 43. The stem portion 43 and its head 44 are preferably integral with the part 39. The head 44 has a flat normal upper surface 45 and may have a rounded or convex lower face 46. The lower surface or face 46 of the head 44 may cooperate with a stop or boss 47ª on the wall 17 of the body 10 during certain phases of operation of the plug.

Means is provided for operating the stem 38 and its associated parts longitudinally with respect to the plug 12 to expand the plug. An operating stem 47 extends longitudinally into the sleeve 29. A packing gland 48 is provided in the polygonal portion 32 of the sleeve to seal about the operating stem 47. The portion 49 of the operating stem projecting from the gland 48 is polygonal in transverse cross section to be readily engageable by a turning tool. A socket 50 is provided in the lower enlarged portion of the operating stem 47 to carry a hardened bushing 51. The bushing 51 may be threaded or otherwise fixed in the socket 50. The lower end of the bushing 51 is preferably flush with the lower end of the socketed operating stem 47. The upper portion of the stem 38 has a thread 52 cooperating with a thread on the interior of the bushing 51. The threaded portion of the stem 38 preferably has extensive engagement or cooperation with the threaded interior of the bushing 51. It will be apparent how rotation of the operating stem 47 results in relative longitudinal movement between the stem 47 and the stem 38.

The means 14 is in the nature of a toggle means and includes two sets or pairs of cooperating toggles 53 operable to force the plug sections 23 outwardly to seal with the body seats 21. One set of toggles 53 is disposed in the upper portion of the plug 12 above the stem part 39 and the other set of toggles 53 is in the lower portion of the plug below the part 39. The toggles 53 are in the form of blocks having convex or rounded ends 54. Suitable concaved or rounded recesses 53 are provided in the inner sides of the plug sections 23 to receive the rounded outer ends 54 of the toggles. The ends of the toggles evenly bear in the recesses 55 and are adapted to turn or pivot therein. It is a feature of the invention that the inner ends 54 of the pairs of toggles 53 have direct cooperation with one another. This direct pivotal cooperation of the inner ends of the toggles insures the proper equalization of the actuating forces on the plug sections 23. The inner ends of the lower toggles 53 are recessed or provided with notches 56 to freely receive or pass the stem portion 43 with clearance. Similar notches 57 are provided in the inner ends of the upper toggles 53 to freely pass the stem 38. The lower toggles 53 are inclined downwardly and inwardly toward the central longitudinal axis of the plug 12 and the upper toggles 53 are inclined upwardly and inwardly toward said axis. The toggles 53 are pitched at a sufficient angle so that they cannot assume positions in horizontal planes when the plug is actuated to seal with the walls of the body. The flat upper surface 45 of the head 44 cooperates with the rounded lower inner ends of the toggles 53 to apply the actuating force to the toggles. Anti-friction bearing means is provided between the lower end of the operating stem 47 and the upper set of toggles 53. A washer 58 surrounds the stem 38 and cooperates with the rounded upper inner corner portions of the toggles 53. An assembly of a series of balls 59 and races 60 is provided between the lower end of the operating stem 47 and the washer 58 to provide for free turning of the operating stem 47 relative to the plug 12 and toggles 53.

A test cock or bleeder valve 60 may be provided to communicate with an opening 61 in the lower wall 17 of the body. The bleeder valve 60 may be opened to drain the fluid from the body 10 when the plug 12 is in its closed position and may be employed to test the operation of the valve.

In operation the plug 12 may be turned from the open position to the closed position by engaging the polygonal portion 32 of the operating sleeve with a wrench or turning tool and turning the sleeve in the proper direction. The lug 36 is adapted to cooperate with an end of the groove 37 to stop the plug 12 in the position where its opening 25 is transverse of the passage 11 and its shoes 26 directly opposite the seats 21. The plug sections 23 may normally be unexpanded so that there is little or no resistance to turning of the plug. The peripheral surfaces of the sections 23 have clearance with the wall of the body opening 16 and offer no resistance to turning of the plug. To expand the plug 12 to tightly seal with the seats 21 the polygonal portion 49 of the operating stem is engaged by a suitable tool and the stem is turned in a right hand direction. The thread on the interior of the bushing 51 cooperates with the thread 52 of the stem 38 to move the operating stem 47 inwardly on the stem 38 or cause outward movement of the stem 38 in the bushing 51 or both. These movements of the operating stem 47 with its bushing 51 and the stem 38 with its part 39 causes pivoting of the toggles 53 toward horizontal positions. The pivoting of the toggles 53 forces the plug sections 23 outwardly so that the shoes 26 are brought into tight sealing engagement with the seats 21 to seal off the opposite ends of the fluid passage 11. During the outward actuation of the plug sections 23 as described above the resistance to inward movement of the operating stem 47 resulting from pivoting of the upper toggles 53 causes the stem 38 to be threaded upwardly into the bushing 51 until the resistance to such movement offered by the lower toggles 53 again results in inward threading of the operating stem 47. In this manner the outward forces exerted by the two sets of toggles 53 become balanced or equalized. The toggles 53 of each pair or set have direct cooperation with one another so that the actuating forces exerted on the two plug sections 23 are equal. The balanced or equalized forces applied to the plug sections 23 at longitudinally spaced points forces the shoes 26 of the sections into even effective engagement with the seats 21 providing leak tight and pressure tight seals at both the upstream and the downstream ends of the passage 11. Before opening the valve it is preferred to turn the operating stem 47 in a reverse or left hand direction to relieve the expanding or outward pressures from the plug sections 23. The plug 12 may then be turned by applying turning force to the projecting portion of the sleeve 29.

Fig. 4 of the drawings illustrates a modified form of the invention in which the stem 38ᵃ for actuating the toggles 53 is a simple elongate member passing longitudinally through the plug 12. A head 44ᵃ is provided on the lower end of the stem 38ᵃ and has a flat normal upper surface for cooperating with the lower set of toggles 53. An annular flange 70 may be provided on the stem 38ᵃ above the lower pair of toggles 53. The portion of the stem 38ᵃ passing through the opening 25ᵃ of the plug is preferably cylindrical and of uniform diameter. A flange 71 may be provided on the stem 38ᵃ below the upper set of toggles 53. The upper portion of the stem 38ᵃ is threaded into the bushing 51 of the operating stem. The opening 25ᵃ in the plug 12 and the inner portions of the fluid passage 11 may be transversely elongated as illustrated in the drawings. The other parts of the valve may be identical with those of the previously described form of the invention. The operation of the valve shown in Fig. 4 of the drawings is the same as that of the form shown in Figs. 1, 2, and 3.

Having described only typical forms and applications of our invention we do not wish to be limited or restricted to the specific forms and applications herein set forth, but wish to reserve to ourselves any modifications or variations that may appear to those skilled in the art or fall within the scope of the following claims:

Having described our invention, we claim:

1. A valve including a body having a fluid passage and an opening intersecting the passage, a plug in the opening comprising two sections, the plug having an opening to register with the fluid passage, toggles for operating the sections outwardly to seal with the wall of the opening, and a stem for operating the toggles having an opening registering with the opening in the plug.

2. A valve including a body having a fluid passage and an opening intersecting the passage, a plug in the opening comprising two sections, the plug having an opening to register with the fluid passage, toggles for operating the sections outwardly to seal with the wall of the opening, and a stem extending between the sections for operating the toggles, the stem having an opening registering with the opening in the plug.

HENRY H. ROBINSON.
THEODORE C. PLATH.